July 6, 1954 — J. PICKLES — 2,682,780
CONVERTIBLE TOP LIFT ACTUATOR
Filed Feb. 11, 1953 — 2 Sheets-Sheet 1
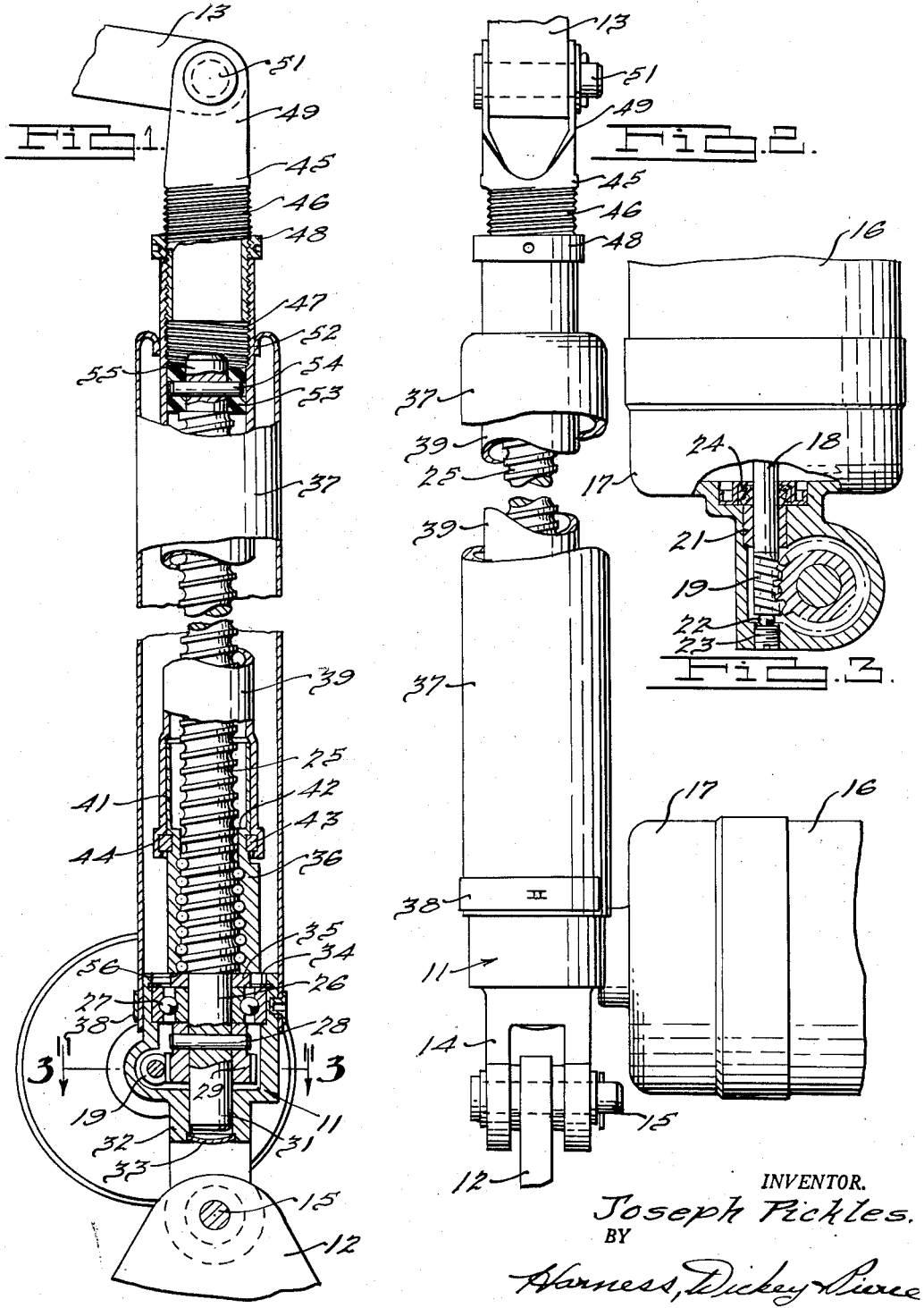
INVENTOR.
Joseph Pickles.
BY
Harness, Dickey & Pierce
ATTORNEYS.

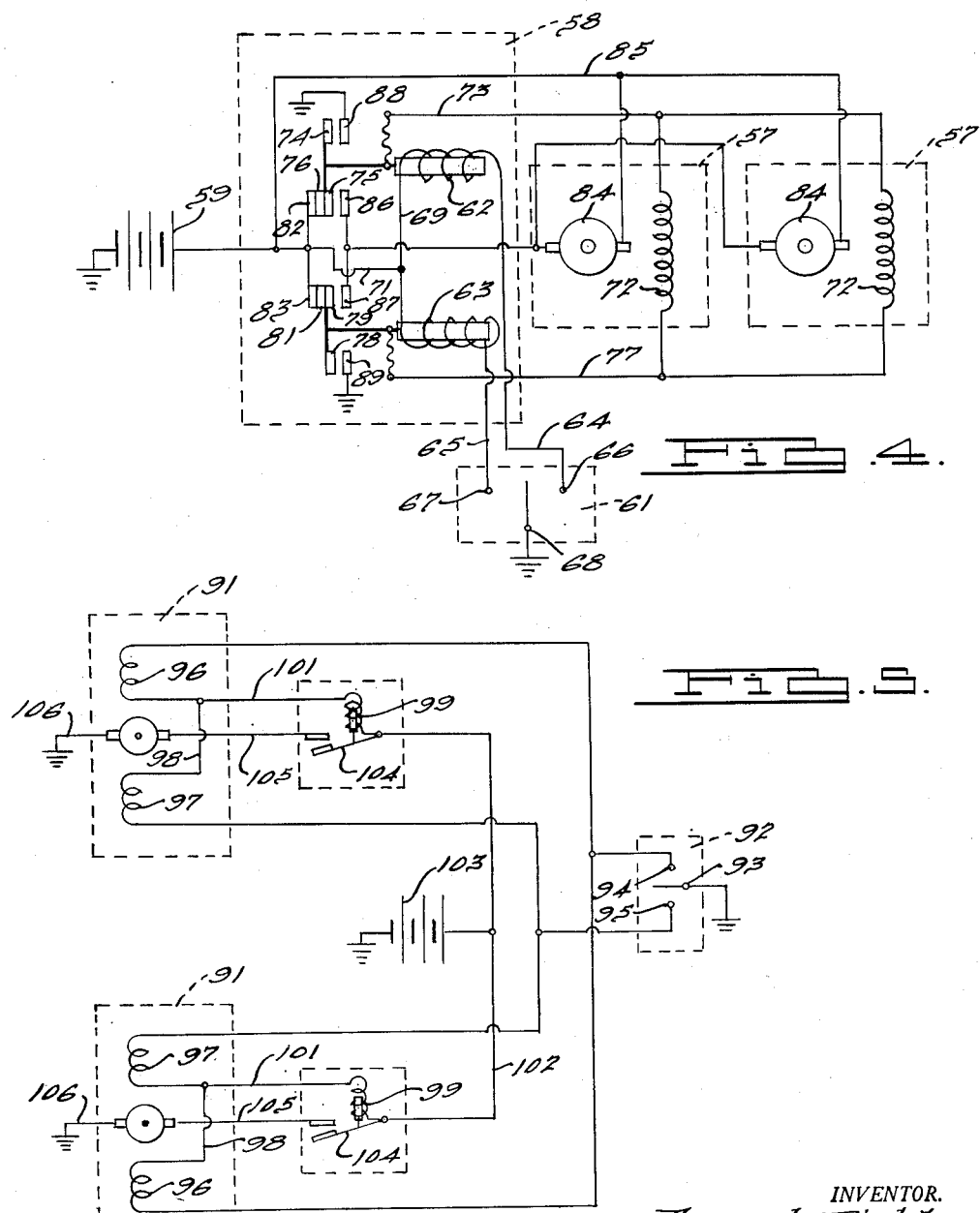

Patented July 6, 1954

2,682,780

UNITED STATES PATENT OFFICE 2,682,780

CONVERTIBLE TOP LIFT ACTUATOR

Joseph Pickles, Dearborn, Mich., assignor to Hupp Corporation, Cleveland, Ohio, a corporation of Virginia Application February 11, 1953, Serial No. 336,241

11 Claims. (Cl. 74—424.8)

1

This invention relates to toplift actuators, and more particularly to electric motor driven screw type actuators for lifting and lowering convertible tops of automotive vehicles and for similar purposes.

It is an object of the present invention to provide an improved toplift actuator utilizing a pair of extensible elements which may be independently driven by two constant speed motors, and in which the amount of friction in the operating parts of the actuator is substantially minimized, whereby the actuators may be driven in reverse by hand operation of the toplift.

It is another object to provide an improved toplift actuator of the above nature, in which a ball nut construction is utilized, thereby achieving a reversible construction which may be operated in either direction.

It is a further object to provide an improved toplift actuating mechanism of the screw type as above described, in which novel freewheeling means are provided for preventing undue strain in the header of the windshield when the top is lifted, and for permitting the electric motors to be energized in a stall position of the actuator without harm.

Other objects, features, and advantages of the present invention will become apparent from the subsequent description, taken in conjunction with the accompanying drawings.

In the drawings:

Figure 1 is a side cross-sectional view of a novel toplift actuator according to the invention, showing the freewheeling construction;

Figure 2 is an end elevational view showing the motor mounting means;

Figure 3 is a cross-sectional detail view of the drive means between the motor shaft and the screw shaft, taken along the line 3—3 of Figure 1;

Figure 4 is an electrical circuit diagram showing the wiring for a pair of driving motors of the full field reversing type; and Figure 5 is an electrical circuit diagram showing the wiring arrangement for a pair of driving motors of the split field reversing type.

The toplift actuator comprises a housing generally indicated at 11 which is pivotally secured at its lower end to a standard 12 forming part of the motor vehicle chassis, and is connected at its upper end to a member 13 forming part of a conventional linkage (not shown) for a vehicle convertible top. It will be understood that while only a single actuator is shown in the illustrated embodiment, a pair of identical actuators, one

2 on each side of the vehicle, will normally be used to actuate both sides of the toplift linkage if the actuator is used for this purpose. The housing 11 is provided with clevis 14 carrying a pivot pin 15 which connects the housing to standard 12, and in the illustrated embodiment the housing 11 also carries an electric motor 16, the end portion 17 of the motor housing being formed as part of housing 11. It will be understood however that the motor 16 could be supported in other ways within the scope of the invention.

The shaft 18 of motor 16 drives a worm 19, the shaft and worm being supported by a bearing 21 disposed within the housing and a thrust bearing 22 at the outer end of the worm and held by a plug 23. A seal 24 is preferably provided at an intermediate portion of shaft 18 adjacent bearing 21. The axis of shaft 18 and worm 19 is transverse to the axis of driving screw 25 of the actuator, which has a lower journal portion 26 supported by an antifriction bearing 27 held by housing 11. Fixed by a pin 28 to extension 26 of the screw is a worm wheel 29 which is in meshing engagement with worm 19. Extension 26 projects beyond worm gear 29 as shown at 31 and is guided by a lower housing portion 32 having a sealing cover 33. Bearing 27 is retained in the housing by means of a ring 34, and a steel washer 35 is fixed to screw shaft extension 26 immediately above bearing 27, for reasons described below.

Screw shaft 25 extends upwardly from housing 11 and is provided with a thread for receiving a plurality of spherical members which are connected to ball nut 36, the ball nut being shown in its lower or retracted position in Figure 1. A dust cover 37 is preferably provided for the screw shaft and ball nut, this cover being of tubular shape and secured by band 38 at its lower end to the housing. The ball nut is connected to the link 13 of the toplift actuating linkage by means of a tubular thrust member 39, which is rotatably secured to a tubular extension 41 of the ball nut. The internal diameter of guide extension 41 is substantially the same as the internal diameter of the main portion of thrust tube 39, and a shoulder 42 is formed at the juncture of the guide extension 41 with the main portion of the ball nut.

The rotatable securing means for the thrust tube 39 is shown in Figure 1. The tube receives at its lower end a key comprising an annular member 43, which fits in corresponding recesses in the thrust tube 39 and ball nut 36. For example, member 43 may be formed of powdered material for lubrication purposes, as two halves of a ring, the end 44 of thrust tube 39 being spun over the key member after they are in place. It will be understood that other forms of rotatably keying the thrust tube 39 to ball nut 36 could be used within the scope of the invention. However, in any case the inherent frictional resistance between the thrust tube 39 and ball nut 36 due to the key 42 and guide extension 41 is substantially greater than the friction between the ball nut and screw shaft 25, so that rotation of the screw shaft will normally drive the ball nut longitudinally of its axis.

The upper end of thrust tube 39 is provided with adjustable securing means for link 13, and in the illustrated embodiment this means includes an adapter member 45 having a threaded portion 46 secured within an internally threaded portion 47 at the end of thrust tube 39. A lock nut 48 is provided on adapter 45 for locking the adapter in the desired longitudinal position with respect to thrust tube 39. The upper end 49 of adapter 45 is bifurcated and carries a pivot pin 51 for connection with link 13. The upper end of dust cover 37 may be provided with an inturned lip 52 surrounding thrust tube 39 as shown in Figure 1.

Means are provided for rotating ball nut 36 along with the screw shaft when the ball nut has reached either end of its stroke, in order to provide freewheeling of the actuator in either direction. This means comprises in the illustrated embodiment a stop member 53 secured by a pin 54 to an extension 55 at the outer end of screw shaft 25. Stop member 53 may be made of a plastic or other suitable material, and the diameter of the stop member is substantially the same as the internal diameter of thrust tube 39. Since stop member 53 is held to the screw shaft 25, it will be seen that when the ball nut 36 reaches the outer end of the screw shaft, shoulder 42 will engage stop member 53. When the ball nut reaches the inner end of the screw shaft the shoulder 56 thereof will engage washer 35 which is fixed to the screw shaft. In either position, therefore, the resulting frictional contact between the ball nut and stop member 53 or stop member 35 will cause ball nut 36 to rotate with screw shaft 25. The thrust tube 39 being held against rotation by its connection with link 13, the ball nut will rotate relative to the thrust tube at key 43. Thus, the force produced on a windshield header when the top is lifted and strikes the header will be substantially reduced, since the force exerted by the driving motor on the linkage when the latter is stalled will be minimized.

The provision of a ball nut arrangement for the screw actuator will result in the minimization of friction, thereby permitting an operator to drive the actuator in either direction by hand, using the toplift linkage. This reversal of operation is also facilitated by the helix angle of worm 19 and worm wheel 29, which is sufficient to allow reversibility of operation, and by the provision of anti-friction thrust bearing 22 for the worm 19. The advantages of this reversibility are readily apparent, since the operator of the vehicle may lift or lower the top by hand in case of power failure.

Figures 4 and 5 illustrate two arrangements for simultaneously driving a pair of electric motors to which the actuators are connected. Preferably, the motors are of a constant speed type, shunt wound motors being illustrated. Due to the fact that the motors are of a constant speed type and are simultaneously energized, mechanical synchronization of the actuators is not essential, although such synchronization may be provided if desired. Figure 4 illustrates schematically the wiring connections for a pair of shunt wound shunt full field reversing motors 57. A relay 58 connects the field and armature leads of the motors to a battery 59 or other source of power and a manual switch 61 shown as a single pole double throw switch. As illustrated, the relay 58 comprises a pair of relay coils 62 and 63 which are connected by leads 64 and 65 respectively to the terminals 66 and 67 of switch 61, pole terminal 68 being connected to ground. The opposite ends of coils 62 and 63 are interconnected by a lead 69 which in turn is connected by lead 71 to the positive side of the battery 59, terminals 66 and 67 thus being at all times connected to the positive side of the battery.

One side of field 72 of each motor 57 is connected by a lead 73 to movable contacts 74, 75 and 76 of relay 62, and the other end of each field winding 72 is connected by a lead 77 to movable contacts 78, 79 and 81 of relay 63. When neither relay is energized, the relays are in their leftward position as shown in Figure 4 in which contact 76 of relay 62 and contact 81 of relay 63 engage stationary contacts 82 and 83 respectively, which are connected to the positive side of the battery. In this position therefore the fields 72 are not energized. One side of armature 84 of each motor 57 is connected by a lead 85 to the positive side of the battery, and the other side of each armature is connected to stationary contacts 86 and 87, which are opposite contacts 75 and 79 respectively.

In operation, the armature circuits of motors 57 will normally be disconnected since contacts 75 and 79 are disengaged from contacts 86 and 87 respectively, and since the shunt field windings 72 are not provided with complete circuits. Upon closing of the terminal 66 of the manual switch 61, relay 62 will be energized and will move to the right. Contact 74 will engage a contact 88 connected to ground, and contact 75 will engage contact 86. It will therefore be seen that one side of armature 84 of each motor will be grounded while the other side remains connected to the battery by lead 85. One side of each field winding 72 will be connected to ground through lead 73, the other side remaining connected to the battery 59 through lead 77, since contacts 81 and 83 remain engaged. The driving motors will therefore rotate so as to move the toplift actuators in one direction.

When it is desired to move the actuators in the opposite direction, terminal 67 of switch 61 is engaged, thereby de-energizing relay 62 and energizing relay 63. Contact 78 of relay 63 will engage a contact 89 connected to ground, while contacts 78 and 87 are engaged. Contacts 76 and 82 of relay 62 will also be engaged due to the leftward movement of this de-energized relay. Thus, armatures 84 will be energized in the same direction as previously, but the polarity of field windings 72 will be reversed, since lead 73 will be connected to the battery and lead 77 to ground. The motors will therefore operate in the reverse direction.

Figure 5 illustrates an arrangement for operating a pair of split field reversing motors 91. The arrangement includes a single pole double throw switch 92 similar to the previous embodiment, the pole terminal 93 thereof being grounded and terminals 94 and 95 being connected to split fields 96 and 97 respectively of each motor.

The other ends of split fields 96 and 97 in each motor are interconnected by a lead 98, this lead being connected to one side of a relay coil 99 by lead 101. These relay coils are preferably heavy low resistance coils capable of carrying relatively large amperage with small voltage drop, and the other ends of the coils are interconnected by a lead 102 which is connected to the positive side of battery 103. Contact arm 104 of each relay is in series with the armature circuit 105 of its corresponding motor, the other side 106 of each armature circuit being grounded.

In operation, with switch 92 open the field coils 96 and 97 will be de-energized and relays 99 will likewise be de-energized, with armature switches 104 open. If terminal 94 of switch 92 is closed, split field windings 96 of each motor 91 will be energized, windings 97 remaining de-energized. The field current will flow through relay coils 99, closing relay switches 104 and thereby closing the armature circuits of the motors. Motors 91 will therefore be driven in one direction. If contact 95 of switch 92 is closed, field windings 96 of each motor will be open-circuited and windings 97 energized. Since the current through windings 97 also passes through relays 99, armature switches 104 will be closed, and the motors will run in the opposite direction.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. A screw type actuator including a gear housing, means for pivotally securing said gear housing on a stationary support, a screw shaft rotatably supported at one end by said housing, means holding said screw shaft against axial movement with respect to said housing, means for driving said shaft, a ball nut mounted on said shaft, means for limiting the travel of said ball nut in either direction, a thrust member carried by said ball nut for connection to a device to be actuated, and means interconnecting said ball nut and said thrust member and providing a limited frictional torque connection therebetween, engagement of the ball nut with either of its limiting stops creating sufficient torque to overcome said interconnecting means, whereby said ball nut will rotate against friction with respect to said thrust member.

2. A screw type actuator including a gear housing, means for pivotally securing said gear housing on a stationary support, a screw shaft rotatably supported at one end by said housing, means holding said screw shaft against axial movement with respect to said housing, a worm gear fixed to said shaft, a worm supported by said housing and meshing with said worm gear, means for driving said worm, a ball nut mounted on said shaft, means for limiting the travel of said ball nut in either direction, a thrust member carried by said ball nut for connection to a device to be actuated, and means interconnecting said ball nut and said thrust member and providing a limited frictional torque connection therebetween, engagement of the ball nut with either of its limiting stops creating sufficient torque to overcome said interconnecting means, whereby said ball nut will rotate against friction with respect to said thrust member.

3. A screw type actuator comprising a housing, means for rockably supporting said housing, a screw shaft rotatably held at one end by said housing and extending outwardly therefrom, means preventing said axial movement of said screw shaft with respect to said housing, a gear fixed to said shaft within said housing, means for driving said gear, a ball nut mounted on said shaft, stop means carried by said shaft at either end thereof and engageable by said ball nut to limit the travel thereof, a thrust tube carried by said ball nut co-axially with said shaft, means for connecting the outer end of said thrust tube to a member to be actuated, said connecting means holding said thrust tube against rotation, and frictional connecting means between said ball nut and said thrust tube and permitting relative rotation therebetween against friction when a predetermined torque is developed on said ball nut, engagement of said ball nut with either of said limiting stops serving to develop said predetermined torque.

4. An actuator for automotive toplifts or the like, including a housing, means for rockably supporting said housing on a stationary support, a screw shaft rotatably supported at one end by said housing, means holding said screw shaft against axial movement with respect to said housing, a worm gear fixed to said screw shaft, a worm meshing with said worm gear within said housing, an electric motor operatively connected to said worm, a ball nut movable on said screw shaft, limit stop members carried by opposite ends of said screw shaft, said ball nut being engageable with said stop members to thereby limit the travel thereof, a thrust tube connected at one end to said ball nut, means for connecting the outer end of said thrust tube to a toplift linkage or the like and for holding said thrust tube against rotation relative to said linkage, and frictional means connecting said thrust tube and ball nut, said frictional means being responsive to a predetermined torque to permit relative rotation against friction of said ball nut and said thrust tube, engagement of said ball nut with either of said limiting stops serving to develop said predetermined torque, whereby said ball nut will rotate together with said screw shaft.

5. The combination according to claim 4, the tooth dimensions of said worm and worm gear being such as to permit reversible operation, whereby axial force exerted on said thrust tube will move said ball nut along said screw shaft.

6. The combination according to claim 5, said motor being supported by said housing for rocking movement therewith, and an anti-friction thrust bearing within said housing at one end of said worm.

7. The combination according to claim 4, said screw shaft having an extension within said housing, an anti-friction bearing supporting said extension at one end thereof, and a housing guide portion for the other end of said extension, said worm gear being fixed to said extension between said bearing and said guide portion.

8. In an actuator for toplift linkages or the like, a housing, means for supporting said housing for rocking movement on a stationary support, a screw shaft rotatably supported at one end by said housing and extending outwardly therefrom, means preventing axial movement of said screw shaft with respect to said housing, a nut traveling on said screw shaft, stop means carried by the opposite ends of said screw shaft and engageable by said nut at the limits of its travel, a thrust tube connectable at one end to said toplift linkage, frictional means comprising an annular key connecting the other end of said thrust tube and said nut, and a guide extension disposed within said other end of the thrust tube, said guide extension having an inner shoulder at one end thereof engageable with the stop at the outer end of said screw shaft, the friction created by such engagement causing said nut to rotate relative to said thrust tube.

9. A screw type actuator including a gear housing, means for pivotally securing said gear housing on a stationary support, a screw shaft rotatably supported at one end by said housing, means holding said screw shaft against axial movement with respect to said housing, means for driving said shaft, a nut mounted on said shaft, means for limiting the travel of said nut in either direction, a thrust member carried by said nut for connection to a device to be actuated, and means interconnecting said nut and said thrust member and providing a limited frictional torque connection therebetween, engagement of the nut with either of its limiting stops creating sufficient torque to overcome said interconnecting means, whereby said nut will rotate against friction with respect to said thrust member.

10. A screw type actuator including a gear housing, means for pivotally securing said gear housing on a stationary support, a screw shaft rotatably supported at one end by said housing, means holding said screw shaft against axial movement with respect to said housing, a worm gear fixed to said shaft, a worm supported by said housing and meshing with said worm gear, means for driving said worm, a nut mounted on said shaft, means for limiting the travel of said nut in either direction, a thrust member carried by said nut for connection to a device to be actuated, and means interconnecting said nut and said thrust member and providing a limited frictional torque connection therebetween, engagement of the nut with either of its limiting stops creating sufficient torque to overcome said interconnecting means, whereby said nut will rotate against friction with respect to said thrust member.

11. A screw type actuator comprising a housing, means for rockably supporting said housing, a screw shaft rotatably held at one end by said housing and extending outwardly therefrom, means preventing axial movement of said screw shaft with respect to said housing, a gear fixed to said shaft within said housing, means for driving said gear, a nut mounted on said shaft, stop means carried by said shaft at either end thereof and engageable by said nut to limit the travel thereof, a thrust tube carried by said nut coaxially with said shaft, means for connecting the outer end of said thrust tube to a member to be actuated, said connecting means holding said thrust tube against rotation, and frictional connecting means between said nut and said thrust tube and permitting relative rotation therebetween against friction when a predetermined torque is developed on said nut, engagement of said nut with either of said limiting stops serving to develop said predetermined torque.

References Cited in the file of this patent

UNITED STATES PATENTS

| Number | Name | Date |
|---|---|---|
| 2,329,802 | Westrope | Sept. 21, 1943 |
| 2,424,492 | Morris | July 22, 1947 |